United States Patent
Takashima

(10) Patent No.: US 8,526,197 B2
(45) Date of Patent: Sep. 3, 2013

(54) COUPLING MEMBER AND ELECTRONIC DEVICE HAVING THE SAME

(75) Inventor: Hidetoshi Takashima, Gifu (JP)

(73) Assignee: Sony Corporation, Tokyo (JP)

( * ) Notice: Subject to any disclaimer, the term of this patent is extended or adjusted under 35 U.S.C. 154(b) by 204 days.

(21) Appl. No.: 13/169,349

(22) Filed: Jun. 27, 2011

(65) Prior Publication Data

US 2012/0020046 A1    Jan. 26, 2012

(30) Foreign Application Priority Data

Jul. 22, 2010    (JP) .................................. 2010-164869

(51) Int. Cl.
*H05K 7/00* (2006.01)
*F16M 11/04* (2006.01)

(52) U.S. Cl.
USPC ...... 361/807; 361/809; 361/679.01; 248/121; 248/127; 248/917

(58) Field of Classification Search
USPC ............ 248/121, 127, 917, 918; 361/679.01, 361/807, 809, 600, 679.02, 679.21, 679.05, 361/679.22; 174/50; 16/110.1, 111.1
See application file for complete search history.

(56) References Cited

U.S. PATENT DOCUMENTS

| | | | | |
|---|---|---|---|---|
| 6,418,010 B1* | 7/2002 | Sawyer | ................... | 361/679.05 |
| 6,822,857 B2* | 11/2004 | Jung et al. | ................ | 361/679.02 |
| 6,837,469 B2* | 1/2005 | Wu et al. | .................... | 248/278.1 |
| 7,236,354 B2* | 6/2007 | Hsu et al. | ................. | 361/679.07 |
| 7,355,844 B2* | 4/2008 | Lauffer et al. | .......... | 361/679.55 |
| 7,744,045 B2* | 6/2010 | Akagawa et al. | ............. | 248/121 |
| 7,869,202 B2* | 1/2011 | Chiang et al. | ............ | 361/679.22 |
| 2004/0084588 A1* | 5/2004 | Liu et al. | .................... | 248/291.1 |
| 2006/0076463 A1* | 4/2006 | Drew | ............................ | 248/121 |
| 2006/0168865 A1 | 8/2006 | Watanabe | | |

FOREIGN PATENT DOCUMENTS

| | | |
|---|---|---|
| JP | 2007-316501 | 12/2007 |
| WO | WO 2004/064017 A1 | 7/2004 |

* cited by examiner

*Primary Examiner* — Angel R Estrada
*Assistant Examiner* — Dimary Lopez
(74) *Attorney, Agent, or Firm* — Oblon, Spivak, McClelland, Maier & Neustadt, L.L.P.

(57) ABSTRACT

A coupling member for stably and easily performing coupling of an object to be supported and a stand and movement after the coupling, and an electronic device having the same are provided The coupling member coupling a plate-shaped object to be supported and a stand having a base and a supporting pillar, includes: a first fixing part which is fixed to a rear face of the object to be supported; a holding part attached to the first fixing part with a gap therebetween; a second fixing part which is fixed to the supporting pillar of the stand; and a cavity housing the supporting pillar of the stand, which is provided between the first and second fixing parts.

13 Claims, 19 Drawing Sheets

COUPLING MEMBER AND ELECTRONIC DEVICE HAVING THE SAME

BACKGROUND

The present disclosure relates to a coupling member for coupling a flat-plate-shaped object to be supported and a stand and an electronic device having the coupling member.

An electronic device such as a thin-type television device or a display device has, generally, a configuration that a flat-plate-shaped display body is supported by a stand. As a related art, such electronic devices include a portable electronic device provided with a ring-shaped handle attached to the rear face of a display unit so that the device is moved to another installation place (see, for example, International Publication No. WO2004/064017). Another technique is also proposed that a handle for carriage is provided for the rear face of a stand (see, for example, Japanese Unexamined Patent Application Publication No. 2007-316501).

SUMMARY

The method of attaching a handle to the rear face of a display unit as in WO2004/064017 is limited to a small-sized model up to about 20 inches and is not easily applied to a medium-sized or large-sized model of 26 inches or larger. In the case of providing a handle for carriage to the rear face of a stand as in Japanese Unexamined Patent Application Publication No. 2007-316501, at the time of carrying the device in a state where the stand is attached to the display unit, there is a risk of fall of the display unit in carriage.

It is therefore desirable to provide a coupling member for stably and easily performing coupling of an object to be supported and a stand and movement after the coupling and an electronic device having the same.

According to an embodiment of the disclosure, there is provided a coupling member coupling a plate-shaped object to be supported and a stand having a base and a supporting pillar, including a first fixing part which is fixed to a rear face of the object to be supported, a holding part attached to the first fixing part with a gap therebetween, a second fixing part which is fixed to the supporting pillar of the stand, and a cavity housing the supporting pillar of the stand, which is provided between the first and second fixing parts.

An electronic device according to an embodiment of the disclosure includes a plate-shaped body for displaying an image, a stand having a base and a supporting pillar, and a coupling member coupling the body and the stand. The coupling member is the above-described coupling member according to an embodiment of the disclosure.

In the coupling member and the electronic device of the embodiments of the disclosure, the body and the stand are coupled to each other by the coupling member as follows. First, the first fixing part of the coupling member is fixed to the rear face of the body as the object to be supported. Next, for example, the user lowers the body toward the supporting pillar of the stand while holding the holding part of the coupling member by one of his/her hands, and placing the other hand at the periphery of the body, thereby housing the supporting pillar of the stand into the cavity between the first and second fixing parts. Subsequently, by fixing the second fixing part to the supporting pillar in the cavity, the body and the stand are coupled to each other by the coupling member. After the coupling as well, for example, the user stably and easily moves the apparatus while holding the holding part of the coupling member by one of his/her hands and placing the other hand on the periphery of the body.

In the coupling member and the electronic device of the embodiments of the present disclosure, the coupling member is provided with the first fixing part which is fixed to the rear face of the object to be supported and the second fixing part which is fixed to the supporting pillar of the stand, the holding part is attached to the first fixing part, and the supporting pillar of the stand is housed in the cavity provided between the first and second fixing parts. Consequently, with a simple configuration, coupling between an object to be supported and the stand and movement after the coupling is performed stably and easily.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION OF THE PREFERRED EMBODIMENTS

Modes for carrying out the present disclosure will be described in detail below with reference to the drawings. The description will be given in the following order.
1. First embodiment (an example where a tilt angle of a body is fixed)
2. First modification (an example of providing a recess for sandwiching a cable)
3. Second embodiment (an example of enabling swivel operation and tilt operation of the body by providing a swing assist member)

First Embodiment

Figure 1:
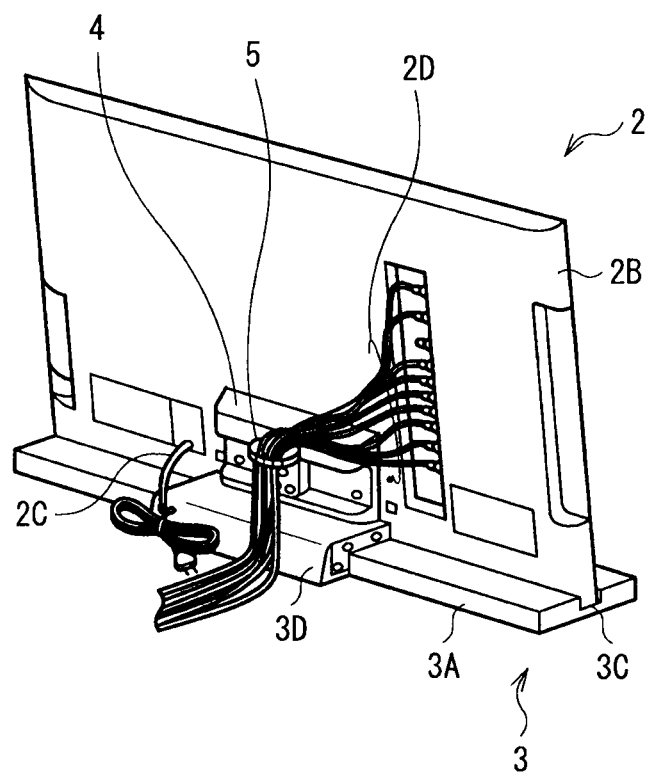
FIG. 1 is a perspective view illustrating the appearance of a television apparatus as an electronic device according to a first embodiment of the present disclosure.

FIG. 1 illustrates the appearance viewed from the rear side of a television apparatus as an electronic device according to a first embodiment of the present disclosure. A television apparatus 1 has a configuration that, for example, a flat-plate-shaped body 2 for displaying an image and a stand 3 are coupled to each other by a coupling member 4. The television apparatus 1 is used not only in a standing type in which the stand 3 illustrated in FIG. 1 is put on a horizontal face of a shelf, a rack, or the like but also in a wall hanging type (not shown in FIG. 1 but refer to FIG. 13) as will be described later).

The body 2 has a flat-shaped display panel 2A (not shown in FIG. 1, refer to FIG. 5) using a display element such as liquid crystal, plasma, organic EL, inorganic EL, electrodeposition or electrochromic display element. The side faces and the rear face of the display panel 2A are covered with a rear-face casing 2B made of resin or metal. From the rear side of the rear-face casing 2B, a power supply cord 2C and cables 2D connected to the display panel 2A are led. The cables 2D are, for example, provided to connect the television apparatus 1 and an external device such as a DVD (Digital Versatile Disc) recording/reproducing apparatus, a BD (Blu-ray Disc) recording/reproducing apparatus, a stand with a built-in speaker, or the like.

Figure 5:
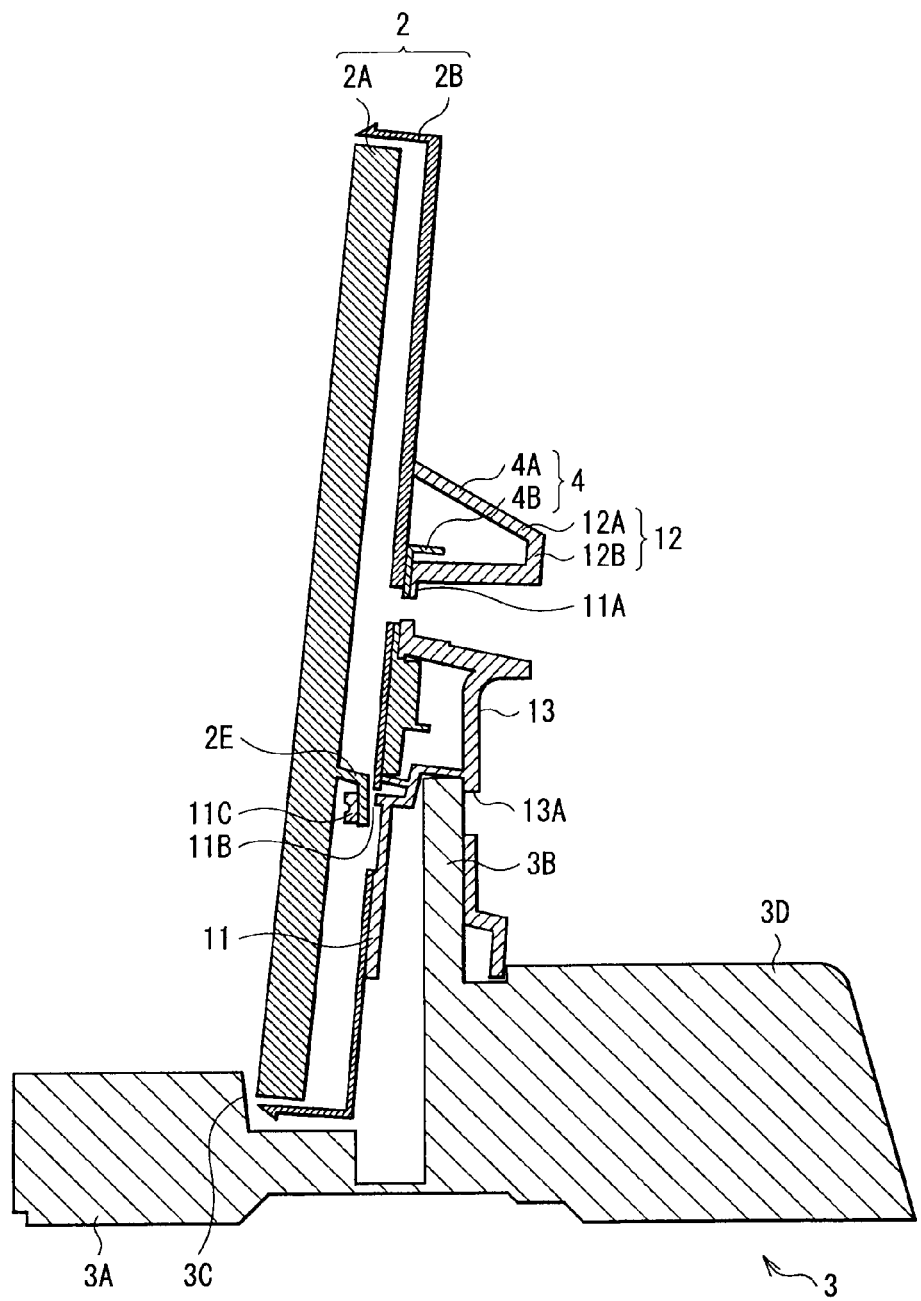
FIG. 5 is a cross section illustrating the configuration of a body and a stand coupled by the coupling member.

The stand 3 is a standing device for supporting the rear side and the lower side of the body 2 as an object to be supported in a state where the body 2 stands and has, for example, a base 3A and a supporting pillar 3B (not shown in FIG. 1, refer to FIG. 5). The base 3A is, for example, a so-called a "bar type" obtained by forming a groove 3C in the top face of a bar-shaped member made of resin or metal. The stand 3 is, for example, a stand with a built-in speaker, having a speaker built-in part 3D in a center of the rear face of the base 3A.

The coupling member 4 is a part for coupling the body 2 and the stand 3 and is attached in, for example, a center in a lower part of the rear face of the body 2. To the coupling member 4, for example, a cable binding part 5 such as a clamper is attached. By the cable binding part 5, the cables 2D led from the rear-face casing 2B are bound neatly and beautifully.

Figure 2:
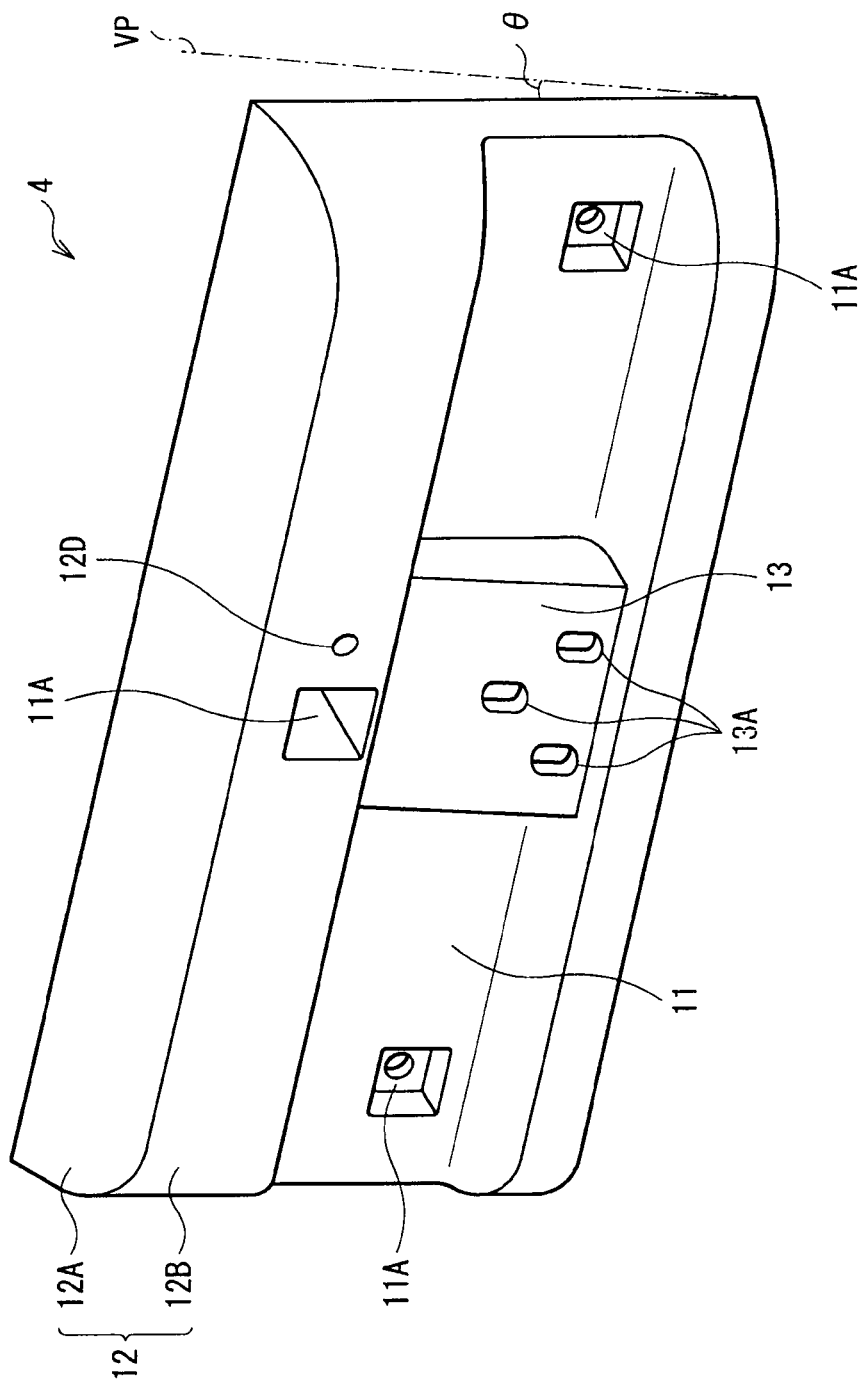
FIG. 2 is a perspective view illustrating a coupling member shown in FIG. 1 in a standing posture.
Figure 3:
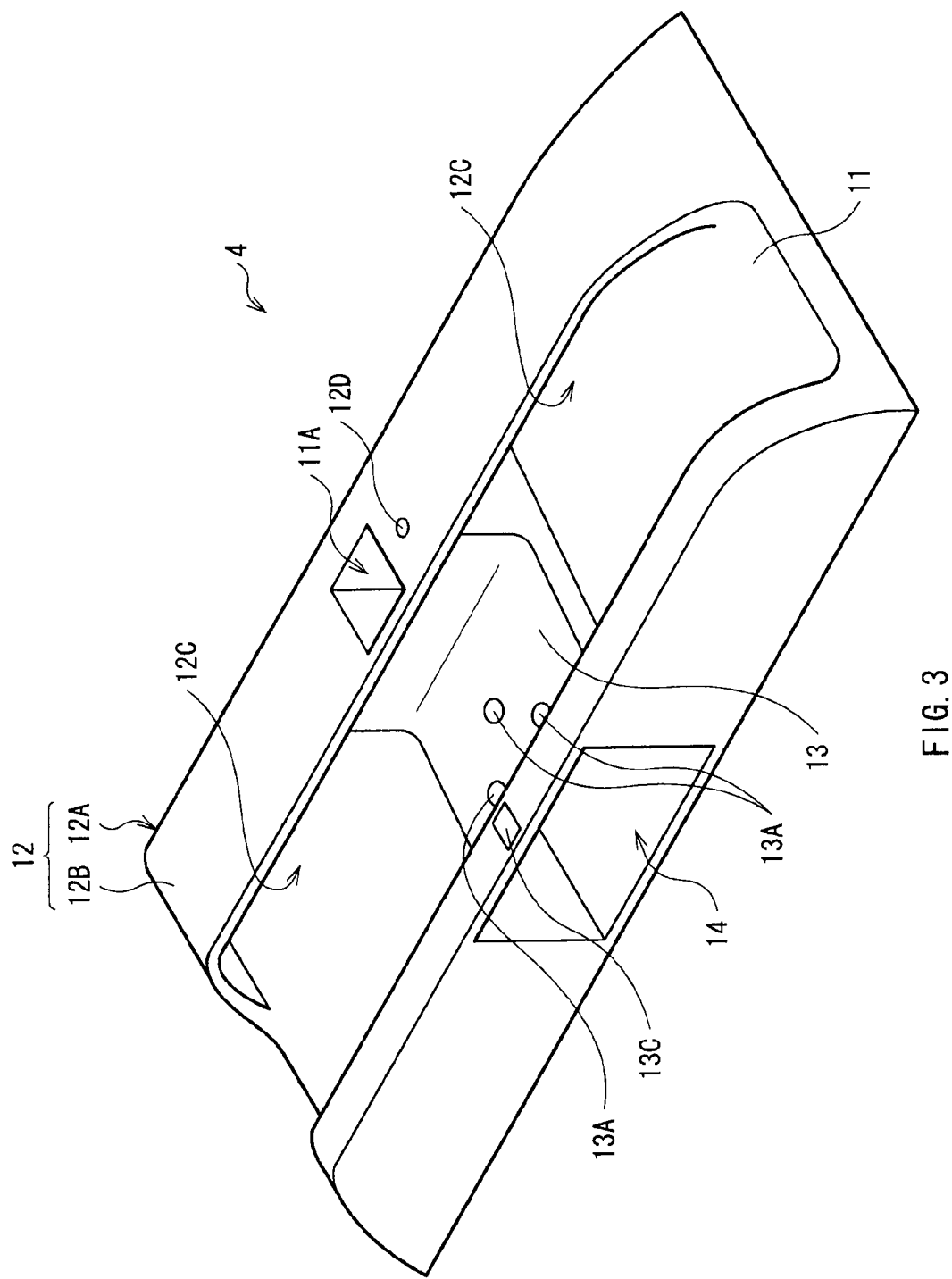
FIG. 3 is a perspective view illustrating the coupling member in a lying posture.
Figure 4:
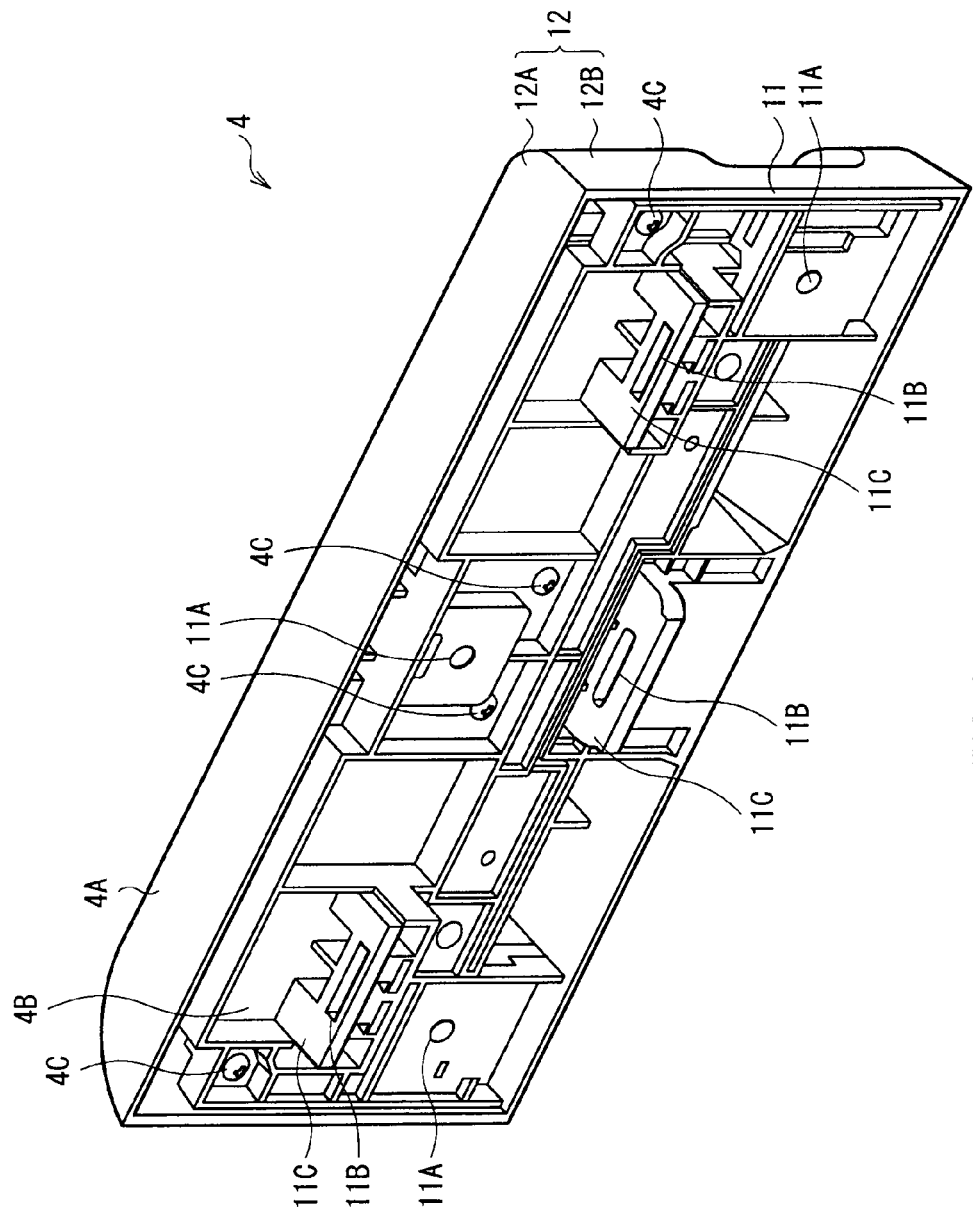
FIG. 4 is a perspective view illustrating the configuration of the coupling member viewed from the rear side.

FIGS. 2 and 3 illustrate the configuration of the coupling member 4 which is viewed from the surface side, in a standing posture and a lying posture, respectively. FIG. 4 illustrates the configuration of the coupling member 4 viewed from the rear side. FIG. 5 illustrates a sectional configuration of the body 2 and the stand 3 coupled by the coupling member 4. The coupling member 4 has, for example, a first fixing part 11 fixed to the body 2, a holding part 12 as a handle, a second fixing part 13 fixed to the supporting pillar 3B of the stand 3, and a cavity 14 housing the supporting pillar 3B of the stand 3.

As illustrated in FIGS. 4 and 5, the first fixing part 11, the holding part 12, the second fixing part 13, and the cavity 14 are constructed by combination of a surface-side member 4A and a rear-side member 4B formed separately by different molds in a resin injection molding process. The surface-side member 4A and the rear-side member 4B are fixed to each other by, for example, a plurality of screws 4C.

The first fixing part 11 is a part having a horizontally-long rectangular plate shape which is fixed to the rear-face casing 2B of the body 2. The first fixing part 11 has a plurality of through holes 11A for screwing to the body 2. Preferably, the first through holes 11A are provided separately from a wall-hanging hole based on the VESA standard and an existing hole for a wall-hanging bracket. Consequently, the number of the first through holes 11A, the interval of the first through holes 11A, the dimensions of the first fixing part 11, and the like are freely determined, so that the number of screws, the size of the first fixing part 11, and the cost are reduced. Specifically, three first through holes 11A are provided and disposed in a triangle shape in an upper part in the center, a left lower part, and a right lower part. On the other hand, in the case of using a wall-hanging hole based on the VESA standard, the first fixing part 11 has to be fixed in four points, and the dimensions of the first fixing part 11 have to be increased.

As illustrated in FIG. 2, the first fixing part 11 tilts at a tilt angle θ of, for example, six degrees with respect to a vertical plane VP in a posture that the coupling member 4 stands. The display panel 2A may be tilted at the same angle as the tilt angle θ. By setting the tilt angle θ to an arbitrary angle, the angle of the display panel 2A is arbitrarily set.

The holding part 12 has a top face 12A extending to the upper side of the first fixing part 11 and a side face 12B extending to the top face 12A, covers the upper part of the first fixing part 11 and constructs a part in the upper part in the front face of the coupling member 4. The holding part 12 is attached to the first fixing part 11 with a gap 12C therebetween. With the configuration, in the coupling member 4, the user easily performs works of coupling the body 2 and the stand 3 and movement after the coupling by gripping the holding part 12 by inserting his/her fingers.

The top face 12A is, for example, a tilted face, but the tilt angle of the top face is not limited. Desirably, the side face 12B is, for example, close to parallel to the first fixing part 11 for a reason that, in the gap 12C in which the user inserts his/her fingers, a space which is uniform in the finger thickness direction is obtained.

In the side face 12B of the holding part 12, an attachment hole 12D for the cable binding part 5 (refer to FIG. 1) for binding the cables 2D led from the body 2 is provided.

The second fixing part 13 is a part fixed to the supporting pillar 3B of the stand 3, and serving as a part of the lower part of the front face of the coupling member 4. The second fixing part 13 has a plurality of second through holes 13A for screwing to the supporting pillar 3B. Concretely, for example, three second through holes 13A are provided and disposed in a triangle shape in an upper part in the center, a left lower part, and a right lower part.

Figure 6:
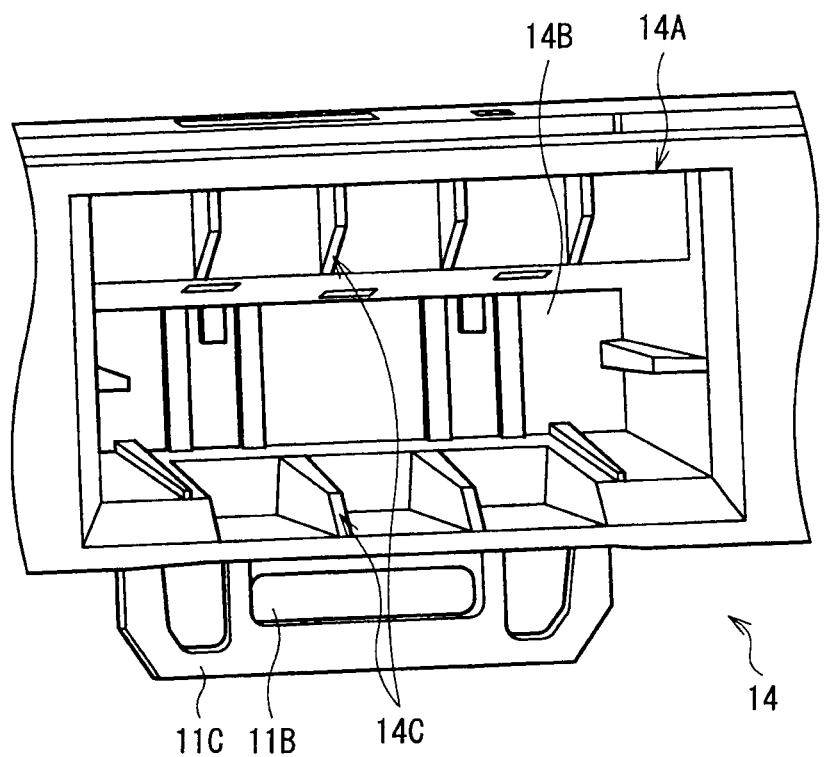
FIG. 6 is an enlarged perspective view illustrating the configuration of a cavity shown in FIG. 3, which is viewed from the bottom side.

The cavity 14 is provided between the first fixing part 11 and the second fixing part 13 and is hollow part for housing the supporting pillar 3B of the stand 3 and is open to the bottom face of the coupling member 4 as illustrated in FIG. 3. Preferably, for example, as illustrated in FIG. 6, the cavity 14 is narrowed from an inlet 14A toward a deeper face 14B and a plurality of guide ribs 14C are provided in the inside so that the supporting pillar 3B of the stand 3 is easily inserted at the time of coupling the stand 3 and the coupling member 4.

Desirably, such a coupling member 4 is made of a material having strength sufficient to support the display panel 2A of the large size such as nylon to which glass filler is added. The coupling member 4 may be made of, for example, polycarbonate to which ABS resin (acrylonitrile butadiene styrene resin) is added.

Further, preferably, the first fixing part 11 is provided with a projection 11C having a locking hole 11B as a mutual locking structure to the rear face of the body 2 as illustrated in FIGS. 4 and 5. The rear face of the display panel 2A of the body 2 is preferably provided with a hook 2E locked in the locking hole 11B as illustrated in FIG. 5. With the configuration, also in the case where the screw in the first through hole 11A in the first fixing part 11 is detached, the hook 2E remains locked in the locking hole 11B. Therefore, the possibility that the body 2 is immediately separated from the coupling member 4 and the stand 3 and falls is reduced, and safety improves. The locking hole 11B and the hook 2E as the mutual locking structure also have the function as a measure for strength and reliably couple the coupling member 4 and the body 2, thereby enabling the number of screws to be decreased.

For example, three projections 11C are provided and disposed in an inverted triangle shape in a lower part in the center, a left upper part, and a right upper part. The positions and the number of projections 11C are not limited.

The locking hole 11B is, preferably, narrowed from the upper end to the lower end so that the hook 2E is easily locked in the locking hole 11B.

For example, the television apparatus 1 is assembled as follows.

Figure 7:
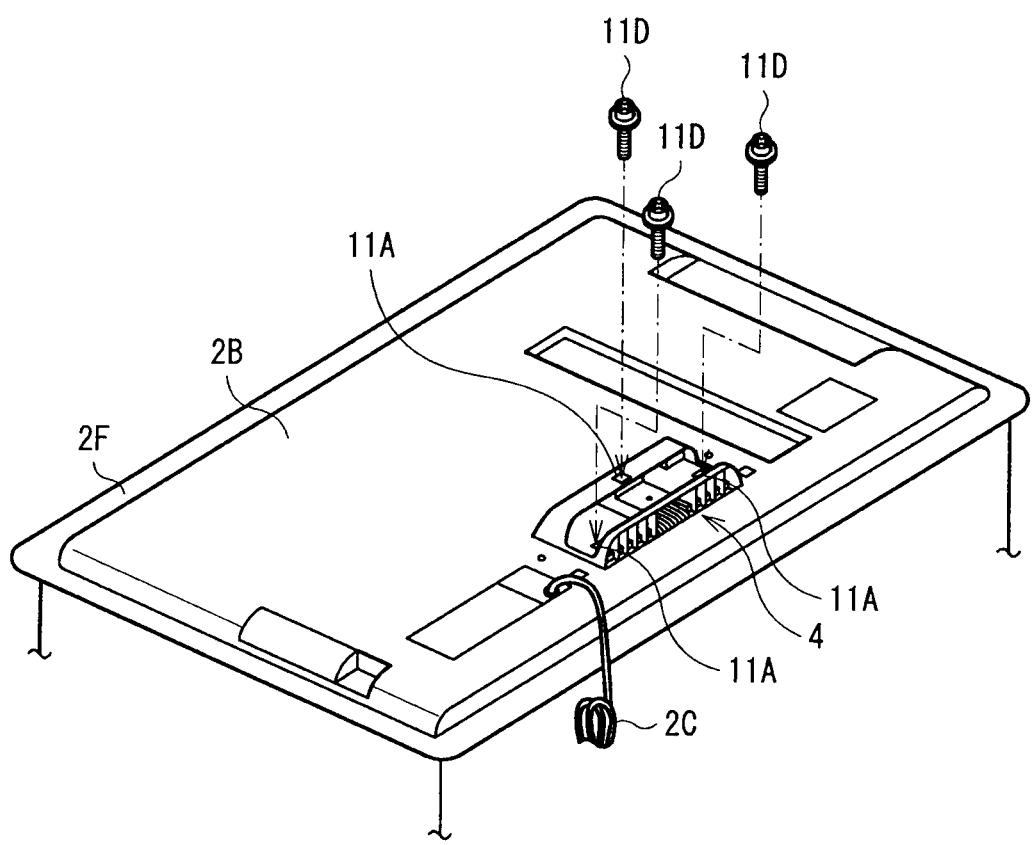
FIG. 7 is a perspective view illustrating a process of attaching the coupling member to the display unit in a method of assembling a display device using the coupling member in process order.
Figure 8:
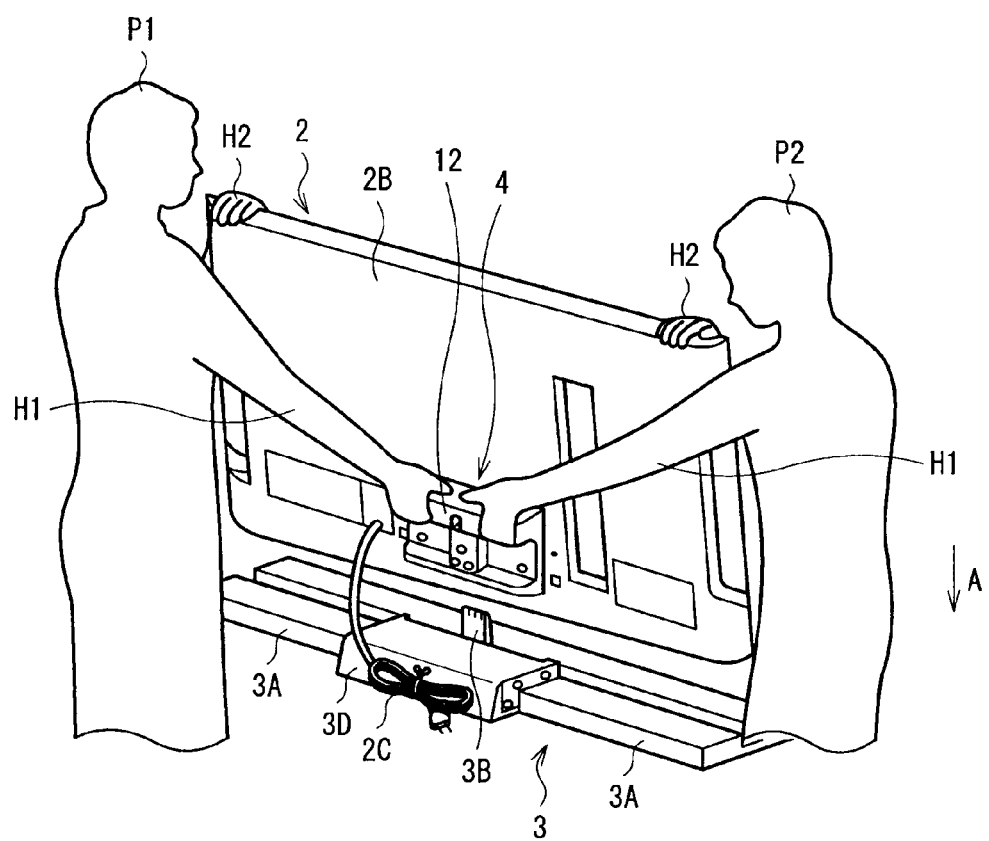
FIG. 8 is a perspective view illustrating a process of attaching the display unit to the stand by using the coupling member.

FIGS. 7 to 13 illustrate a method of assembling the television apparatus 1 using the coupling member 4 in the process order. First, the rear-face casing 2B is attached to the side face and the rear face of the above-described display panel 2A to form the body 2. As illustrated in FIG. 7, the body 2 is mounted on a work stand 2F with the rear-face casing 2B facing upward. Subsequently, as illustrated in FIG. 7, the coupling member 4 is mounted in a predetermined position on the rear-face casing 2B, and the first fixing part 11 of the coupling member 4 is fixed to the rear-face casing 2B of the body 2 using the first through hole 11A of the first fixing part 11 and screws 11D.

Figure 9:
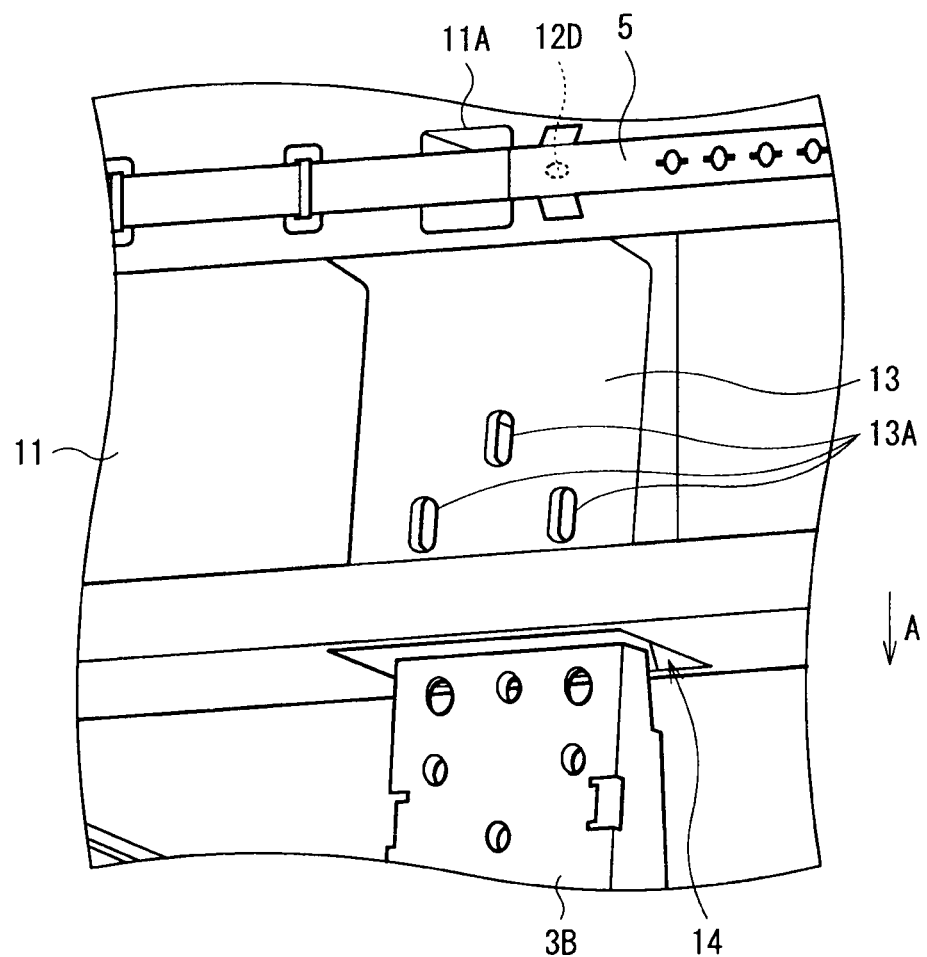
FIG. 9 is an enlarged perspective view illustrating a part of FIG. 8.

Subsequently, for example, each of two persons P1 and P2 lowers the body 2 toward the supporting pillar 3B of the stand 3 as illustrated by arrow A in FIG. 9 by holding the holding part 12 of the coupling member 4 by a hand H1 as one of his/her hands and placing the other hand H2 on a periphery 2G of the rear-face casing 2B of the body 2. By the operation, the supporting pillar 3B of the stand 3 is housed in the cavity 14 between the first and second fixing parts 11 and 13. FIG. 9 illustrates a state where the cable binding part 5 is attached in the attachment hole 12D in the side face 12B of the holding part 12.

Figure 10:
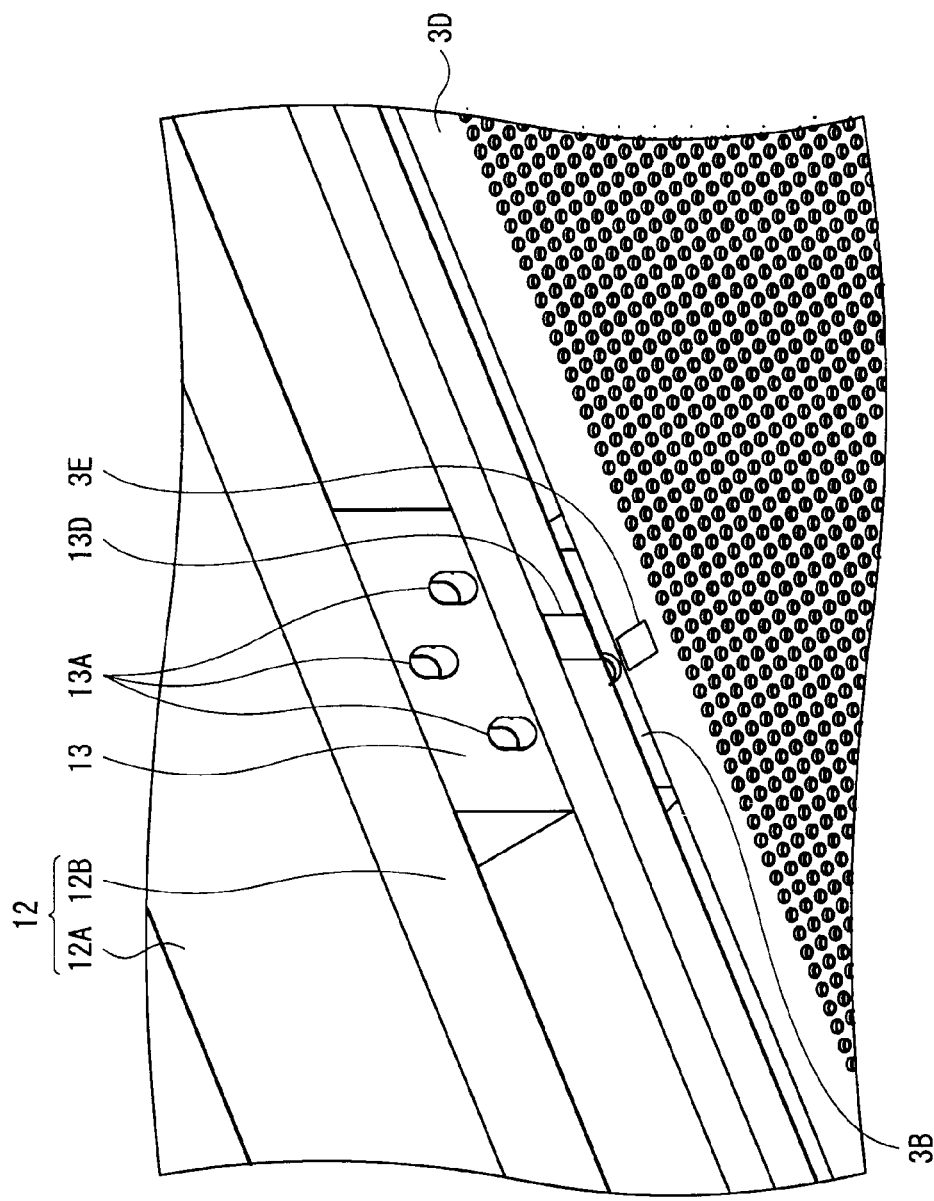
FIG. 10 is a perspective view for explaining matchmarks for position adjustment between the coupling member and the stand.

At this time, for example, as illustrated in FIG. 10, preferably, a matchmark 13C for positioning the base 3A of the stand 3 or the speaker built-in part 3D is provided at the lower end of the second fixing part 13. On the other hand, preferably, a matchmark 3E for positioning with the second fixing part 13 is provided also in the top face of the base 3A of the stand 3. The matchmarks 13C and 3E may have, for example, recess shapes or grain shapes (unevenness like wrinkles). With the matchmarks 13C and 3E, the worker and the user easily recognize the positional relation between the second fixing part 13 and the supporting pillar 3B of the stand 3 and use the matchmarks 13C and 3E as guides for attachment of the body 2 to the stand 3. In particular, it is suitable to the case where the display panel 2A is large and the worker or user does not easily directly recognize the positions of the cavity 14 and the supporting pillar 3B of the stand 3 during the work.

Figure 11:
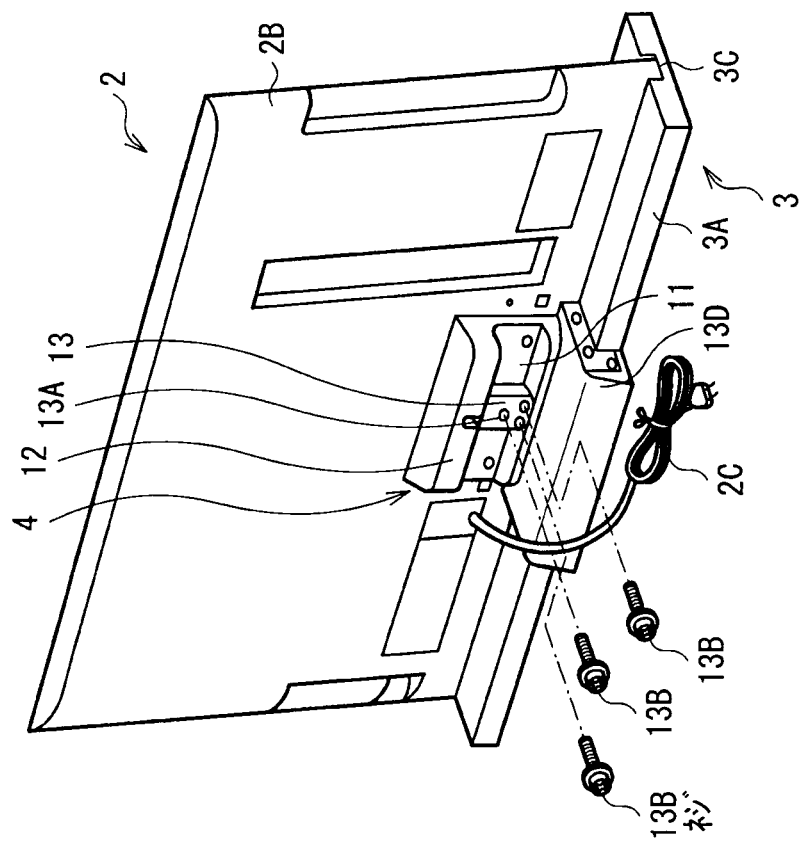
FIG. 11 is a perspective view illustrating a process of fixing the coupling member to the stand.

Subsequently, as illustrated in FIG. 11, using the second through hole 13A and the screw 13B of the second fixing part 13, the second fixing part 13 of the coupling member 4 is fixed to the supporting pillar 3B in the cavity 14. As a result, the body 2 and the stand 3 are coupled to each other by the coupling member 4.

After the coupling as well, for example, the worker or user holds the holding part 12 of the coupling member 4 by one of his/her hands, places the other hand on the periphery 2G of the rear-face casing 2B of the body 2, and moves the apparatus stably and easily.

Since the weight of a television apparatus of related art is decreasing as the thickness is being reduced, the number of users who try to move the television apparatus from a usual installation position at the time of cleaning is increasing. Although the weight is being decreased, the weight has a weight of tens kilograms. In addition, since the television apparatus is becoming thinner, it does not have a thickness enough to form a recess or the like as a handle in the body. It is therefore difficult to perform the coupling and movement stably and easily. Further, since a glossy surface or glass surface is employed as the exterior of the display panel to improve the design, when the user touches the glossy surface or glass surface, finger prints are adhered and conspicuous as dirt. Consequently, in many cases, the user tries not to directly touch the glossy surface or glass surface at the time of the coupling and movement.

In contrast, in the embodiment, as described above, the worker or user performs the coupling and movement stably and easily by holding the holding part 12 of the coupling member 4 by one of his/her hands and placing the other hand on the periphery 2G of the rear-face casing 2B of the body 2. In such a manner, the worker or user performs the coupling and movement without directly touching the glossy surface or glass surface, so that the possibility that the appearance deteriorates due to dirt is reduced.

Figure 12A:
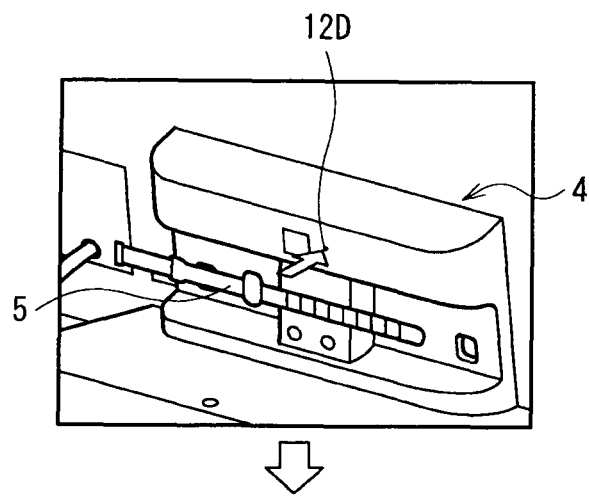
FIGS. 12A to 12C are perspective views illustrating a process of attaching a cable binding part.
Figure 12B:
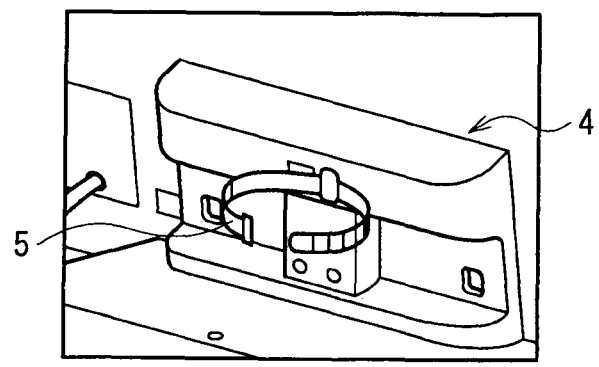
Figure 12C:
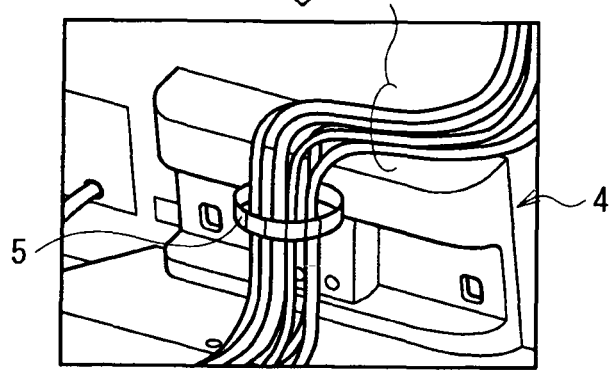

FIGS. 12A to 12C illustrate processes of attaching the cable binding part 5 shown in FIG. 1 in the process order. First, as illustrated in FIGS. 12A and 12B, the cable binding part 5 is attached to the attachment hole 12D in the side face 12B of the holding part 12 by a screw or the like. Subsequently, as illustrated in FIG. 12C, the cables 2D led from the rear-face casing 2B are bound by the cable binding part 5. By the above, the television apparatus 1 illustrated in FIG. 1 is completed.

Figure 13:
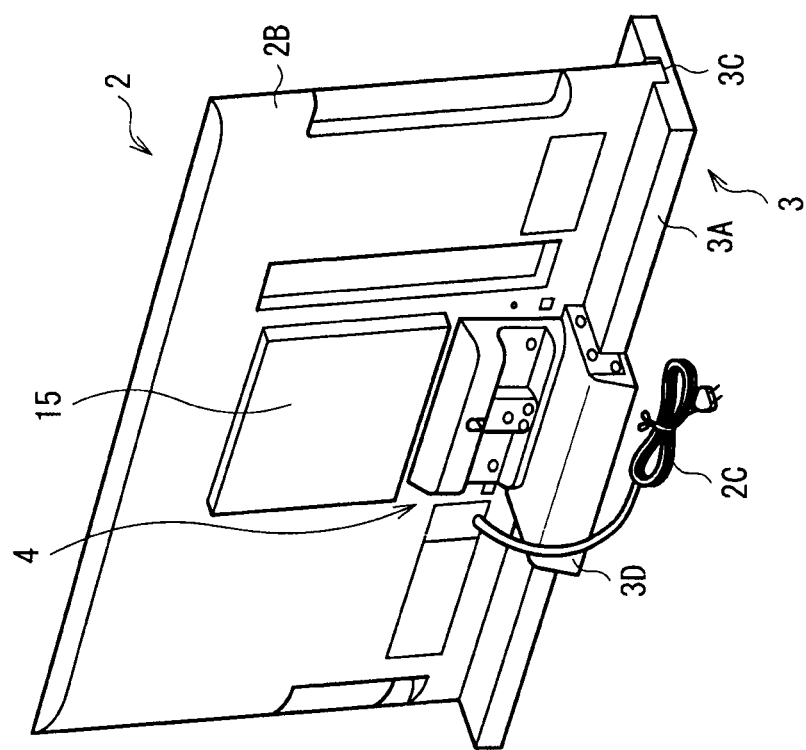
FIG. 13 is a perspective view illustrating a state where a wall hanging unit is attached.

FIG. 13 illustrates a state where a wall-hanging unit 15 is attached to the television apparatus 1 shown in FIG. 1. In the rear-face casing 2B, a screw hole (not illustrated) for attaching the wall-hanging unit 15 is formed on the basis of the VESA standard or in accordance with an existing wall-hanging bracket. In the embodiment, as described above, the first through hole 11A in the first fixing part 11 may be provided separately from a wall-hanging hole based on the VESA standard or a hole for an existing wall-hanging bracket. Consequently, the wall-hanging unit 15 may be attached to the body 2 in a state where the coupling member 4 and/or the stand 3 remains attached to the body 2, and the resultant may be used as a wall-hanging type. Therefore, it is unnecessary to detach the coupling member 4 and/or the stand 3 to change the apparatus to the wall-hanging type, and design and convenience for the user improves. The configuration of the wall-hanging unit 15 is not limited.

As described above, in the embodiment, the coupling member 4 is provided with the first fixing part 11 which is fixed to the rear face of the body 2 and the second fixing part 13 which is fixed to the supporting pillar 3B of the stand 3, the holding part 12 is attached to the first fixing part 11, and the supporting pillar 3B of the stand 3 is housed in the cavity 14 between the first and second fixing parts 11 and 13. Consequently, with the simple configuration, coupling of the body 2 and the stand 3 and movement after the coupling is performed stably and easily.

Therefore, in a medium/large-sized model, by separately transporting the body 2 and the stand 3 and coupling the body 2 and the stand 3 in a final destination by a person in charge of installation service, the volume of a packing box is reduced, and the transport efficiency is improved.

The coupling member 4 is not seen from the front face of the television apparatus 1 (the visible surface side of the display panel 2A), and design viewed from the side face is also excellent.

First Modification

Figure 14:
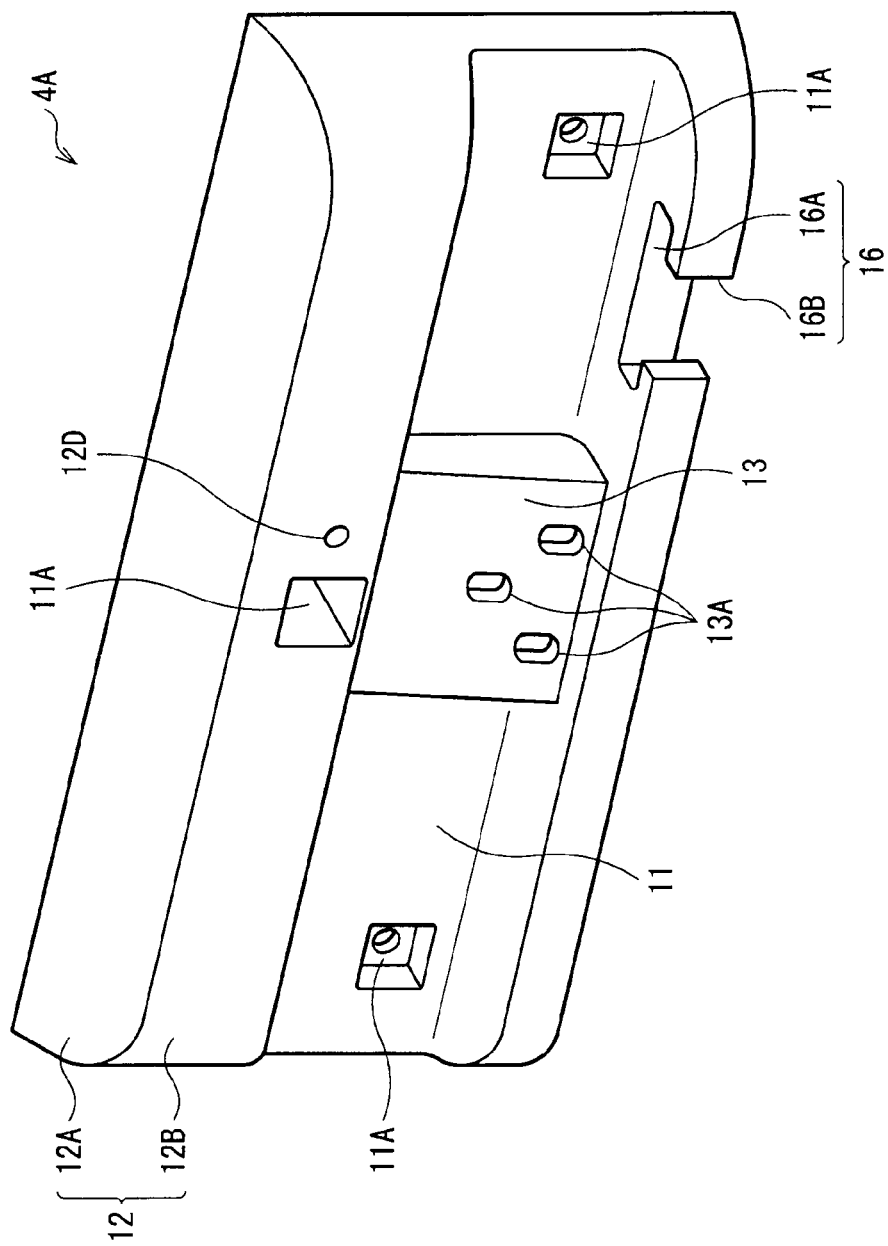
FIG. 14 is a perspective view illustrating the configuration of a coupling member as a first modification.

FIG. 14 illustrates the configuration of a coupling member 4A as a first modification. The coupling member 4A has a recess 16 for housing the cables led from the body 2 and binds the cables 2D even when there is no cable binding part 5 such as a clamper. The recess 16 has, for example, a cable housing part 16A for housing the cable 2D and an inlet 16B narrower than the cable housing part 16A. The position of the recess 16 is not limited but may be provided, for example, at the lower end of the first fixing part 11. Except for this, the coupling member 4A has configuration, operation, and effect similar to those of the coupling member 4 of the first embodiment.

Second Embodiment

Figure 15B:
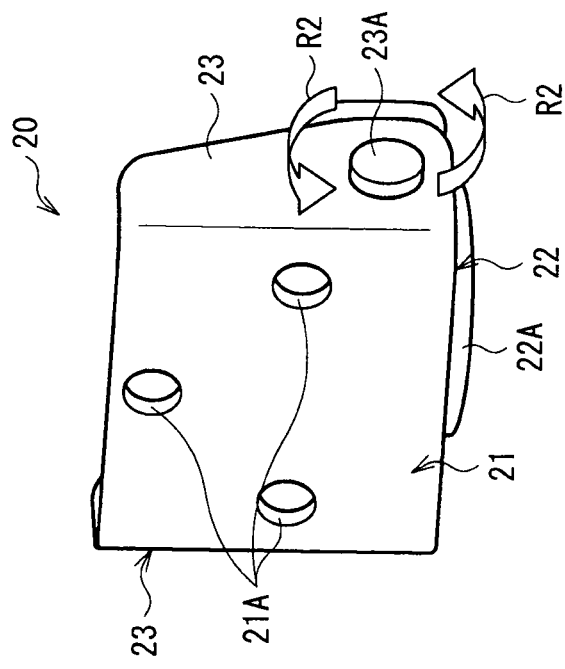
FIGS. 15A and 15B are perspective views illustrating the appearance of a swing assist member for a coupling member according to a second embodiment of the disclosure.
Figure 15A:
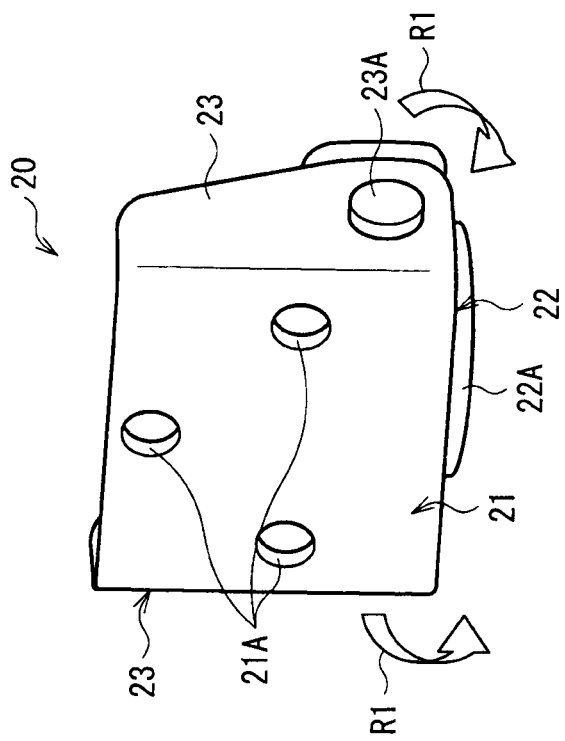
Figure 16:
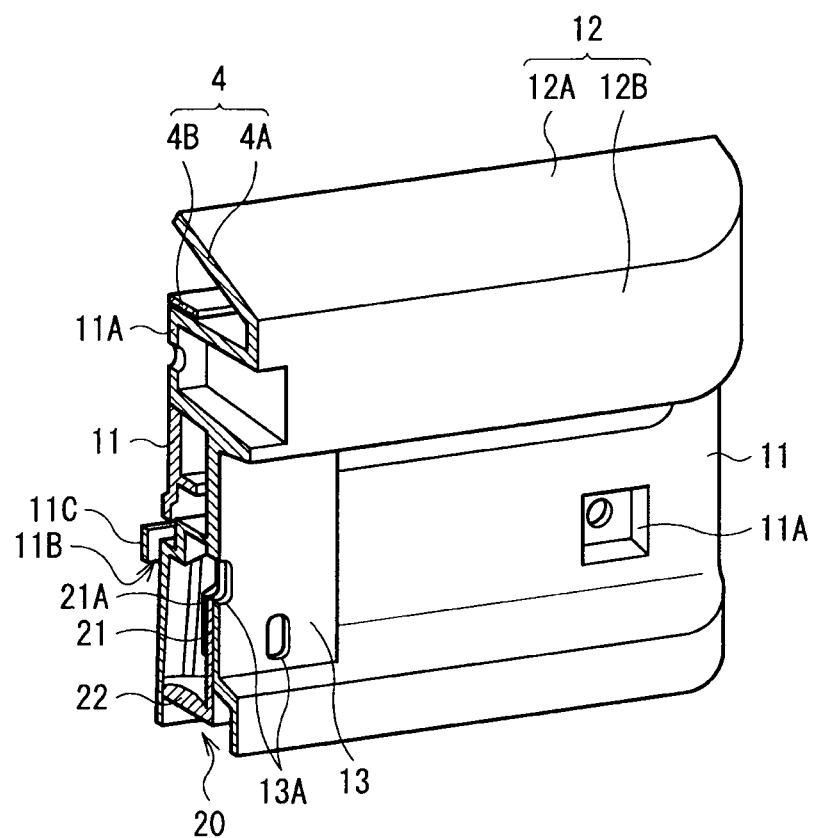
FIG. 16 is a cross section illustrating a state where the swing assist member shown in FIGS. 15A and 15B is assembled in a cavity of the coupling member.
Figure 17:
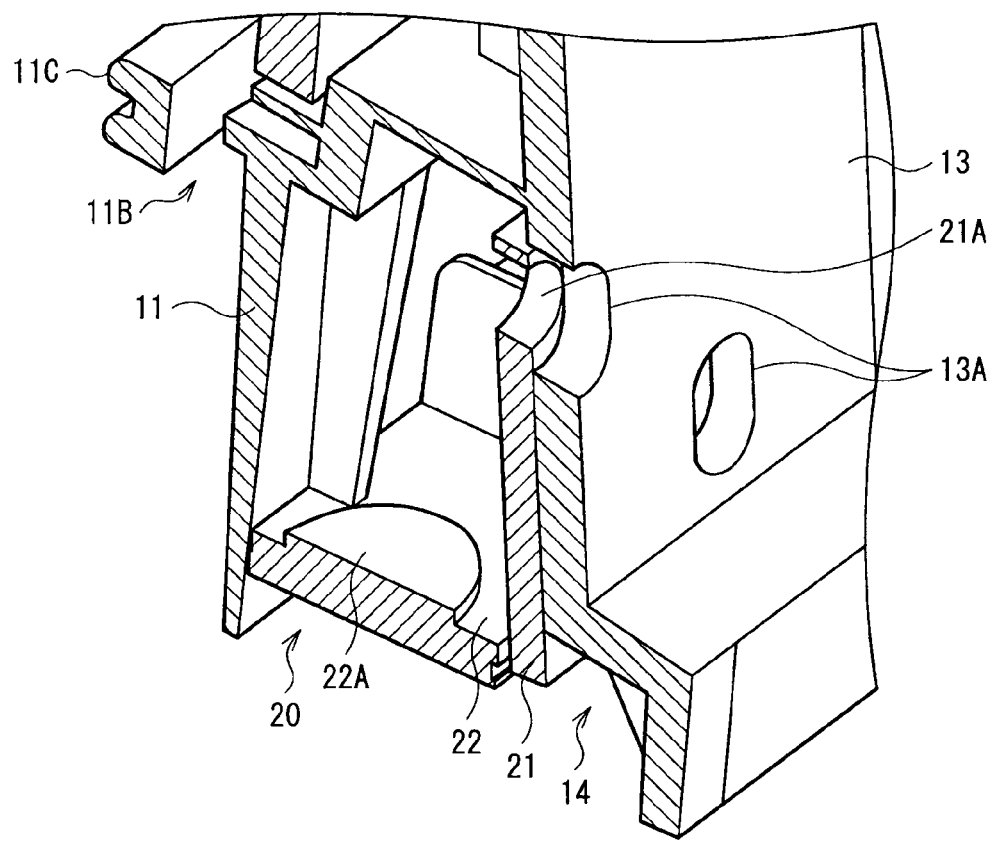
FIG. 17 is an enlarged cross section illustrating a part of FIG. 16.
Figure 18:
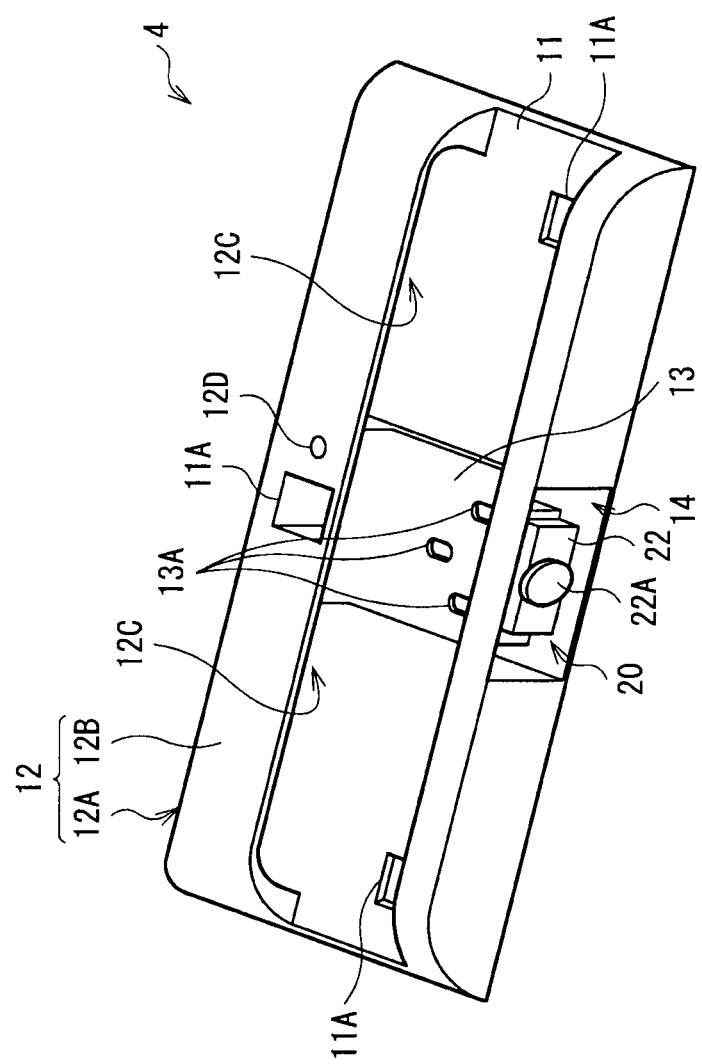
FIG. 18 is a perspective view illustrating a state where the swing assist member is assembled in the cavity in the coupling member, from the bottom side.
Figure 19:
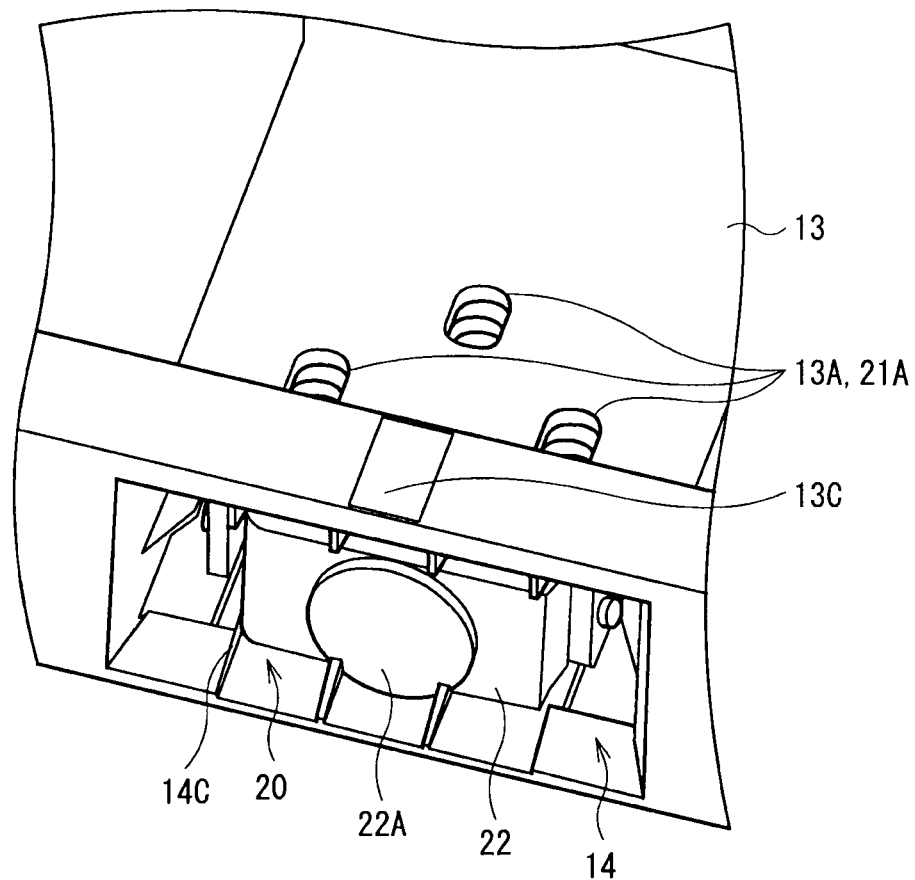
FIG. 19 is an enlarged perspective view illustrating a part of FIG. 18.

FIGS. 15A and 15B illustrate the appearance of a swing assist member 20 of the coupling member 4 according to a second embodiment of the disclosure. In the television apparatus 1 of the second embodiment, the swing assist member 20 is assembled in the cavity 14 in the coupling member 4, and the second fixing part 13 and the supporting pillar 3B of the stand 3 are coupled to each other with the swing assist member 20. With the configuration, in the embodiment, swivel operation of making the body 2 swivel in the lateral direction as illustrated by arrows R1 as illustrated in FIG. 15A and tilt operation of making the body 2 tilted in the vertical direction as indicated by arrows R2 as illustrated in FIG. 15B are performed. Except for this, the coupling member 4 of the embodiment has configuration, operation, and effect similar to those of the first embodiment.

The swing assist member 20 has, for example, on both sides of a rear face 21 and a bottom face 22, a pair of side faces 23. The rear face 21 is a face to be fixed to the second fixing part 13 of the coupling member 4 and has through holes 21A matching the second through holes 13A. The bottom face 22 is swingably fixed to the supporting pillar 3B of the stand 3 by a swivel center part 22A, thereby allowing the swivel operation of the body 2. The side faces 23 are fixed swingably to the supporting pillar 3B of the stand 3 by a tilt center part 23A, thereby allowing the tilt operation of the body 2. The swivel center part 22A and the tilt center part 23A may be, concretely, screws which are fastened screwably to the supporting pillar 3B and the swing assist member 20.

In the television apparatus 1, the rear face 21 of the swing assist member 20 is fixed to the second fixing part 13 of the coupling member 4, and the bottom face 22 and the side faces 23 are swingably fixed to the supporting pillar 3B of the stand 3. Therefore, for example, by making the body 2 swing in the arrow R1 directions about the swivel center part 22A of the bottom face 22 as a center, the body 2 is turned in the lateral direction (swivel operation), and the rotation angle in the horizontal direction is allowed to be changed. For example, by making the body 2 swing about the tilt center part 23A of the side faces 23 as a center, the body 2 is allowed to swing in the vertical direction (tilt operation), and the tilt angle in the front/rear directions is changed.

In the embodiment as described above, the rear face 21 of the swing assist member 20 is fixed to the second fixing part 13 of the coupling member 4, and the bottom face 22 and the side faces 23 are swingably fixed to the supporting pillar 3B of the stand 3, so that the swivel operation and the tilt operation of the body 2 are allowed.

Although the present disclosure has been described above by the embodiments, the disclosure is not limited to the embodiments but may be variously modified. For example, although the case where the tilt angle $\theta$ of the display panel 2A is 6° has been described to simplify the description, the tilt operation of any tilt angle $\theta$ is realized by the same mechanism.

Although the case where the stand 3 is a bar-type speaker-built-in stand has been described in the foregoing embodiment, the configuration of the stand 3 is not limited as long as it has the base and the supporting pillar. For example, the stand 3 may be a bar-type stand which does not have therein a speaker or a stand having a normal inverted T shape.

Further, in the foregoing embodiments, the case where the three first through holes 11A, the three second through holes 13A, and the three through holes 21A in the rear face 21 of the swing assist member 20 are provided and three fastening screws are used for fixing the three holes has been described. Obviously, the number of through holes and the number of fastening screws vary according to the size and the shape of each of the coupling member 4 and the swing assist member 20.

Although the case where an object to be supported is the body 2 of the television apparatus 1 has been described in the foregoing embodiments, the coupling member as an embodiment of the disclosure is applicable not only to a television apparatus but also to other electronic devices such as a display device like a monitor of a personal computer, a digital photo frame, and the like. It is widely applicable also to a structure for coupling a plate-shaped object to be supported such as a picture or a sign and a stand having a base and a supporting pillar.

The present disclosure contains subject matter related to that disclosed in Japanese Priority Patent Application JP 2010-164869 filed in the Japanese Patent Office on Jul. 22, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A coupling member coupling a plate-shaped object to be supported and a stand having a base and a supporting pillar, comprising:
   a first fixing part which is fixed to a rear face of the object to be supported;
   a holding part attached to the first fixing part with a gap therebetween, the holding part including a side face that covers an upper part of the first fixing part, and a bottom of the side face of the holding part forms an opening to the gap;

a second fixing part which is fixed to the supporting pillar of the stand, and the second fixing part extends into the opening to the gap; and a cavity housing the supporting pillar of the stand, which is provided between the first and second fixing parts.

2. The coupling member according to claim 1, wherein the first fixing part is provided with a mutual locking structure for a rear face of the object to be supported.

3. The coupling member according to claim 2, wherein a matchmark to position with the base of the stand is provided in a lower end of the second fixing part.

4. The coupling member according to claim 3, further comprising a swing assist member which is housed in the cavity, wherein the swing assist member includes:

a rear face which is fixed to the second fixing part;

a bottom face which is swingably fixed to the supporting pillar, thereby changing an angle of rotation in the lateral direction of the object to be supported; and a side face which is swingably fixed to the supporting pillar, thereby changing an angle of tilt in front/rear directions, of the object to be supported.

5. The coupling member according to claim 1, wherein an upper part of the second fixing part extends outward to the side face of the holding part.

6. The coupling member according to claim 5, wherein the upper part of the second fixing part divides the gap into two separate spaces.

7. The coupling member according to claim 1, wherein the first fixing part, the holding part, and the second fixing part are integral parts.

8. An electronic device comprising:

a plate-shaped body to display an image, a stand having a base and a supporting pillar, and a coupling member coupling the body and the stand, wherein the coupling member includes:

a first fixing part which is fixed to a rear face of the body;

a holding part attached to the first fixing part with a gap therebetween, the holding part including a side face that covers an upper part of the first fixing part, and a bottom of the side face of the holding part forms an opening to the gap;

a second fixing part which is fixed to the supporting pillar of the stand, and the second fixing part extends into the opening to the gap; and a cavity housing the supporting pillar of the stand, which is provided between the first and second fixing parts.

9. The electronic device according to claim 8, wherein a mutual locking structure is provided for a surface opposed to the object to be supported, of the first fixing part and a rear face of the object to be supported.

10. The electronic device according to claim 9, wherein matchmarks to position are provided in a lower end of the second fixing part and the base of the stand.

11. The electronic device according to claim 10, further comprising a swing assist member which is housed in the cavity, wherein the swing assist member includes:

a rear face which is fixed to the second fixing part;

a bottom face which is swingably fixed to the supporting pillar, thereby changing an angle of rotation in the lateral direction of the object to be supported; and a side face which is swingably fixed to the supporting pillar, thereby changing an angle of tilt in front/rear directions, of the object to be supported.

12. The electronic device according to claim 8, wherein a hole to attach a part which binds cables led from the body is provided in the holding part.

13. The electronic device according to claim 8, wherein a recess to sandwich cables led from the body is provided at a lower end of the first fixing part.

* * * * *